United States Patent [19]
> 
> ## Rasshofer et al.
> 
> [11] Patent Number: 4,540,720
> 
> [45] Date of Patent: * Sep. 10, 1985

[54] POLYAMINES, A PROCESS FOR THE PRODUCTION OF POLYAMINES AND THEIR USE IN THE PRODUCTION OF POLYURETHANES

[75] Inventors: Werner Rasshofer, Cologne; Gerhard Grögler, Leverkusen; Klaus König, Leverkusen; Dieter Dieterich, Leverkusen, all of Fed. Rep. of Germany

[73] Assignee: Bayer Aktiengesellschaft, Leverkusen, Fed. Rep. of Germany

[ * ] Notice: The portion of the term of this patent subsequent to Jul. 30, 2002 has been disclaimed.

[21] Appl. No.: 401,472

[22] Filed: Jul. 26, 1982

[30] Foreign Application Priority Data

Aug. 7, 1981 [DE] Fed. Rep. of Germany ....... 3131252

[51] Int. Cl.$^3$ .................. C07C 127/15; C07C 127/24
[52] U.S. Cl. ..................................... 521/159; 528/60; 528/64; 528/45; 528/62; 528/480; 528/481; 528/489; 564/393; 564/468
[58] Field of Search ....................... 528/60, 64, 45, 62, 528/480, 481, 489; 521/159; 564/393, 468

[56] References Cited

U.S. PATENT DOCUMENTS

| | | | |
|---|---|---|---|
| 2,888,439 | 5/1959 | Simons | 260/77.5 |
| 3,044,989 | 6/1962 | Shivers | 260/77.5 |
| 3,184,502 | 5/1965 | Mueller et al. | 260/482 |
| 3,385,829 | 5/1968 | Heydkamp et al. | 260/75 |
| 3,625,871 | 12/1971 | Traubel et al. | 260/2.5 AY |
| 3,808,250 | 4/1974 | Blahak et al. | 260/455 R |
| 3,865,791 | 2/1975 | Brinkmann et al. | 260/77.5 CH |
| 4,129,741 | 12/1978 | Schmidt et al. | 560/50 |
| 4,153,801 | 5/1979 | Schmidt et al. | 548/312 |
| 4,163,831 | 8/1979 | Gessell | 526/153 |
| 4,169,206 | 9/1979 | Mazanek et al. | 560/50 |
| 4,172,050 | 10/1979 | Gessell | 252/431 R |
| 4,180,644 | 12/1979 | Marquis et al. | 528/68 |
| 4,224,417 | 9/1980 | Hajek et al. | 521/166 |
| 4,247,677 | 1/1981 | Schmidt et al. | 528/68 |
| 4,260,557 | 4/1981 | Mazanek et al. | 260/45 |
| 4,260,729 | 4/1981 | Schmidt et al. | 528/68 |
| 4,386,218 | 5/1983 | Rasshofer et al. | 564/38 |

FOREIGN PATENT DOCUMENTS

| | | |
|---|---|---|
| 2948419 | 8/1981 | Fed. Rep. of Germany . |
| 3039600 | 5/1982 | Fed. Rep. of Germany . |
| 1033912 | 6/1966 | United Kingdom . |
| 1117494 | 6/1968 | United Kingdom . |

OTHER PUBLICATIONS

H. John, J. Prakt Chemie, 130, pp. 314 et seq.
H. John, J. Prakt Chemie, 130, pp. 332 et seq.

*Primary Examiner*—John Kight
*Assistant Examiner*—Marvin L. Moore
*Attorney, Agent, or Firm*—Gene Harsh; Joseph C. Gil; Lyndanne M. Whalen

[57] ABSTRACT

The invention relates to a simplified, economic process for the production of polyamines by the alkaline hydrolysis of compounds containing terminal aromatic and/or aliphatic isocyanate groups (including modified isocyanates or NCO-prepolymers and semi-prepolymers with NCO-contents of from 0.5 to 40% by weight), with strong aqueous bases, direct isolation of the polyamines from the carbamate stage being possible by thermal carbamate decomposition and/or solvent extraction.

The invention also relates to the use of the aromatic and/or aliphatic polyamines containing primary NH$_2$-groups obtainable by the process according to the invention for the production of polyurethanes, such as optionally cellular polyurethane plastics and polyurethane foams.

14 Claims, No Drawings

POLYAMINES, A PROCESS FOR THE PRODUCTION OF POLYAMINES AND THEIR USE IN THE PRODUCTION OF POLYURETHANES

This invention relates to a simplified process for the production of polyamines by the alkaline hydrolysis of compounds containing terminal aromatic and/or aliphatic isocyanate groups (including modified isocyanates or NCO-prepolymers and semi-prepolymers, with NCO-contents of from 0.5 to 40% by weight), with aqueous bases, including direct isolation of the polyamines from the carbamate stage by thermal carbamate decomposition and/or by solvent extraction.

BACKGROUND OF THE INVENTION

It is known that aromatic isocyanates can be converted into primary aromatic amines by acid hydrolysis (for a fairly recent example, see Japanese Pat. No. 55 007-827). However, the reaction is incomplete by this method because the amine formed during hydrolysis further reacts with unreacted isocyanate to form the corresponding urea. This further reaction cannot be suppressed even by using excess strong mineral acid.

German Auslegeschrift No. 1,270,046 describes a process for the production of certain primary aromatic amines containing polyalkylene glycol ether segments in which reaction products of aromatic diisocyanates or triisocyanates with polyalkylene glycol ethers and/or polyalkylene glycol thioethers (preferably those having molecular weights in the range of from 400 to 4000) are reacted with secondary or tertiary carbinols. The products of this reaction are then subjected to thermal dissociation at elevated temperatures in an inert solvent (optionally in the presence of acid catalysts). Apart from the high dissociation temperature, the disadvantage of this process lies in the fact that flammable, readily-volatile alkenes (which are explosive in admixture with air) are formed during the thermal dissociation of the urethanes, necessitating that appropriate safety measures be taken.

German Auslegeschrift No. 1,694,152 relates to the production of prepolymers containing at least two terminal amino groups by reacting hydrazine, amino-phenyl ethylamine or other diamines with an NCO-prepolymer of a polyether polyol and polyisocyanates (in an NCO:NH ratio of from 1:1.5 to 1:5). In this process, unreacted amine has to be carefully removed in another process step because it catalyzes the reaction with polyisocyanates to a considerable extent, thus leading to short processing times in addition to actually participating itself as a reactant.

Another possible method for synthesizing polyamines containing urethane groups is described in French Pat. No. 1,415,317. NCO-prepolymers containing urethane groups are converted with formic acid into the N-formyl derivatives which are hydrolyzed to form terminal aromatic amines. The reaction of NCO-prepolymers with sulfamic acid according to German Auslegeschrift No. 1,155,907 also leads to compounds containing terminal amino groups. In addition, relatively high molecular weight preadducts containing aliphatic, secondary and primary amino groups are obtained in accordance with Auslegeschrift No. 1,215,373 by reacting relatively high molecular weight hydroxyl compounds with ammonia in the presence of catalysts under pressure and at elevated temperature or, in accordance with U.S. Pat. No. 3,044,989, by reacting relatively high molecular weight polyhydroxyl compounds with acrylonitrile, followed by catalytic hydrogenation. According to German Offenlegungsschrift No. 2,546,536 and U.S. Pat. No. 3,865,791, relatively high molecular weight compounds containing terminal amino groups and urethane groups are also obtained by reacting NCO-prepolymers with enamines, aldimines or ketimines containing hydroxyl groups, followed by hydrolysis of the resulting compounds.

Still another possible method for synthesizing aromatic polyamines containing urethane and ether groups lies in the ring-opening process which takes place during the reaction of isatoic acid anhydride and diols. Polyamines of this type are described, for example, in U.S. Pat. No. 4,180,644 and in German Offenlegungsschrift Nos. 2,019,432; 2,619,840; 2,648,774 and 2,648,825. The resulting poor reactivity of aromatic ester amines obtained in this way, however, is a disadvantage for numerous applications.

The reaction of nitroaryl isocyanates with polyols, followed by reduction of the nitro groups to aromatic amine groups, is also known (U.S. Pat. No. 2,888,439). The primary disadvantage of this process lies in the high cost of the reduction step.

It is also known that certain heteroaromatic isocyanic acid esters can be converted into heteroaromatic amines by basic hydrolysis. However, the hydrolysis conditions described for two quite specific heteroaromatic monoisocyanic acid esters in H. John, J. Prakt. Chemie, 130, 314 et seq and 332 et seq (1931) are not only totally unsuitable for the conversion of polyisocyanate compounds into aliphatic and/or aromatic amines, they are also dangerous.

Two of Applicants' own earlier applications Nos. (P 29 48 419.3 and P 30 39 600.0) described multistage processes for the production of polyamines by the alkaline hydrolysis of NCO-preadducts, with excess quantities of a "strong" base (aqueous solutions of alkali- and-/or earthalkali hydroxides or tetraalkylammonium hydroxides) to form carbamates; followed by acidification with mineral acids or ion exchange resins in quantities exceeding the quantity of base, resulting in decomposition of the carbamate, after which excess quantities of acid are optionally neutralized with bases and the polyamines are subsequently isolated.

It has now surprisingly been found that aromatic and/or aliphatic polyamines can be obtained by reacting compounds containing free NCO-groups (with NCO-content of from 0.5 to 40%, by weight), with strong bases (aqueous solutions of alkali- and earthalkali hydroxides, alkalisilicates, alkali aluminates or tetraalkylammonium hydroxides) and carefully recovering the polyamines from the resulting compounds containing carbamate groups without additional reaction stages involving further reactants, such as acids to decompose the carbamates. A thermal decomposition and/or solvent extraction are sufficient to recover the desired polyamines from the reaction mixture comprising compounds containing carbamate groups.

Compared with conventional processes, the process according to the invention has several significant advantages.

1. The conversion of the NCO-compounds into amines is carried out simply and economically as a one-pot process.

2. Conventional reaction vessels may be used without any need for safety precautions to be incorporated in their design.
3. The process may also be advantageously carried out continuously.
4. The components on which the NCO-compounds are based (i.e., for example, modified polyisocyanates, polyisocyanates, polyols and amines) are inexpensive products available in large quantities.
5. The reaction yields are substantial and the volume/time yield is high.
6. The process is environmentally sound in that it may be carried out in the absence of solvents, only small quantities of carbon dioxide are released and only very small quantities of salt (carbonic acid salts from the bases) accumulate.

DESCRIPTION OF THE INVENTION

Accordingly, the present invention is directed to a process for the production of aromatic and/or aliphatic primary polyamines by the hydrolysis of compounds containing free isocyanate groups, comprising (I) converting aromatic and/or aliphatic compounds containing free NCO-groups and having an NCO-content of from 0.5 to 40% by weight, preferably from 1.2 to 25% by weight and, more preferably, from 1.5 to 15% by weight, optionally in solution in an NCO-inert solvent, into compounds containing carbamate groups, by mixing with a strong aqueous base such as mentioned above and at least a stoichiometric quantity of water and (II) converting the compounds containing carbamate groups into polyamines and recovering the polyamines from the reaction mixture comprising compounds containing carbamate groups by either (A) heat treating the mixture to decompose the carbamate groups and then separating off the polyamines, or (B) decomposing the carbamate groups while extracting the polyamines with a solvent.

The present invention also relates to the use of the polyamines containing aromatic and/or aliphatic primary NH$_2$-groups obtainable by the process according to the invention in the production of polyurethanes, such as optionally cellular polyurethane plastics and polyurethane foams, by reacting:

(A) polyisocyanates and/or blocked polyisocyanates with
(B) polyamines, and optionally
(C) other low molecular weight and/or relatively high molecular weight compounds containing isocyanate-reactive groups, optionally
(D) in the presence of auxiliaries and known additives, characterized in that the polyamines produced by the process according to the invention are used as component (B).

The NCO-compounds containing two or more aromatic and/or aliphatic free NCO-groups which are suitable for use in the process according to the invention (also referred to simply as "NCO-compounds") are either: modified polyisocyanates of the type formed by partial conversion of the isocyanate groups into urea, biuret or uretdione or isocyanurate groups; or NCO-prepolymers of polyfunctional compounds containing NCO-reactive hydrogen atoms, and having a molecular weight in the range of from 18 to 12,000 and, optionally, excess quantities of polyisocyanates; or, optionally, semi-prepolymers of NCO-prepolymers and additional polyisocyanates.

Examples of suitable modified polyisocyanates include polyisocyanates containing urea groups (water modification) which are described, for example, in German Pat. No. 1,230,778; polyisocyanates containing biuret groups which are described in U.S. Pat. Nos. 3,124,605 and 3,201,372 and in British Pat. No. 889,050; polyisocyanates containing isocyanurate groups which are described in U.S. Pat. No. 3,001,973 and in German Pat. Nos. 1,022,789 and 1,222,067; and dimeric or oligomeric polyisocyanates containing uretdione groups, which are known compounds or may be obtained by known processes (a number of such uretdione polyisocyanates are mentioned in *Analytical Chemistry of the Polyurethanes*, Vol. 16, Part III, High Polymer Series (Wiley, 1969)). Suitable modified polyisocyanates containing urea and/or biuret and/or uretdione and/or isocyanurate groups normally have an NCO-content of from 5 to 37.5% by weight, preferably from 10 to 25% by weight, and are substantially free from urethane groups.

The NCO-compounds used in the process according to the invention are also, in particular, NCO-prepolymers of the type obtained in a known manner by reacting high molecular weight and/or low molecular weight compounds containing hydroxy and/or amino and/or thiol groups as reactive groups (with molecular weights of from 60 to approximately 12,000) with an excess of polyisocyanate.

Polyisocyanates suitable for use in the production of the compounds containing free NCO-groups are, in principle, any aliphatic, cycloaliphatic, araliphatic, aromatic and heterocyclic polyisocyanates substantially free from hydrolyzable groups, apart from the NCO-groups, of the type described, for example, by W. Siefken in Justus Liebigs, *Annalen der Chemie*, 562, pages 75–136. Such compounds may correspond to the formula,

$Q(NCO)_n$, wherein
n=2 to 4, preferably 2, and
Q is an aliphatic hydrocarbon radical containing from 3 to 18, and preferably from 6 to 10, carbon atoms; a cycloaliphatic hydrocarbon radical containing from 4 to 15, and preferably from 5 to 10, carbon atoms; an aromatic hydrocarbon radical containing from 6 to 15, and preferably from 6 to 13, carbon atoms; or an araliphatic hydrocarbon radical containing from 8 to 15, and preferably from 8 to 13, carbon atoms. Examples of such compounds include 1,4-tetramethylene diisocyanate; 1,6-hexamethylene diisocyanate; 1,12-dodecane diisocyanate; and cycloaliphatic diisocyanates in the form of mixtures of their position and/or stereo isomers, such as cyclobutane-1,3-diisocyanate, cyclohexane-1,3- and -1,4-diisocyanate, 1-isocyanato-3,3,5-trimethyl-5-isocyanatomethyl cyclohexane, 2,4- and 2,6-hexahydrotolylene diisocyanate, hexahydro-1,3- and/or -1,4-phenylene diisocyanate, perhydro-2,4'- and/or -4,4'-diphenylmethane diisocyanate. Aromatic diisocyanates are particularly suitable including, for example, 1,3- and 1,4-phenylene diisocyanate; 2,4- and 2,6-tolylene diisocyanate and mixtures of these isomers; diphenylmethane-2,4'- and/or -4,4'-diisocyanate, including its alkyl- and chlorine-substituted derivatives; and naphthylene-1,5-diisocyanate. Other suitable diisocyanates include the 2,4'-diisocyanatodiphenyl sulfides and 2-(ω-isocyanatoalkyl)-phenyl isocyanates described in German Offenlegungsschrift No. 2,922,966 and the alkyl-substituted diphenyl methane diisocyanates described in European Pat. No. 24,665 and in German Offenlegungsschrift No. 2,935,318.

Additional suitable polyisocyanates include, for example, triphenyl methane-4,4',4''-triisocyanate; polyphenyl polymethylene polyisocyanates of the type obtained by condensing aniline with formaldehyde, followed by phosgenation and described, for example, in British Pat. Nos. 874,430 and 848,671; and m- and p-isocyanatophenyl sulfonyl isocyanates according to U.S. Pat. No. 3,454,606. Also, perchlorinated aryl polyisocyanates of the type described, for example, in German Auslegeschrift No. 1,157,601 (U.S. Pat. No. 3,277,138); norbornene diisocyanates according to U.S. Pat. No. 3,492,330; polyisocyanates containing isocyanurate groups of the type described, for example, in U.S. Pat. No. 3,001,973, and in German Pat. Nos. 1,022,789; 1,222,067; 1,027,394; 1,929,034; and 2,004,048 are suitable for use as polyisocyanates. Finally, polyisocyanates containing urethane groups of the type described, for example, in Belgium Pat. No. 752,261 or in U.S. Pat. Nos. 3,394,164 and 3,644,457; polyisocyanates containing acylated urea groups according to German Pat. No. 1,230,778; and polyisocyanates obtained by telomerization reactions of the type described, for example in U.S. Pat. No. 3,654,196 may also be used.

It is also possible to use the distillation residues containing isocyanate groups which are obtained in the commercial production of isocyanates, optionally in solution in one or more of the above-mentioned polyisocyanates. Mixtures of the above-mentioned polyisocyanates may, of course, also be used.

In general, it is preferred to use the commercially readily-available polyisocyanates, for example, 2,4- and 2,6-tolylene diisocyanate and mixtures of these isomers ("TDI"); polyphenyl polymethylene polyisocyanates of the type obtained by condensing aniline with formaldehyde, followed by phosgenation ("crude MDI"); and polyisocyanates containing urethane groups, isocyanurate groups or urea groups ("modified polyisocyanates"). Particularly, it is preferred to use modified polyisocyanates of the type derived from 2,4- and/or 2,6-tolylene diisocyanate and from 4,4'- and/or 2,4'-diphenylmethane diisocyanate.

The NCO-prepolymers are preferably produced using relatively high molecular weight compounds which have a molecular weight of from 400 to 12,000, more particularly from 400 to 6000, and which contain at least 2, preferably 2 to 4 and, more particularly 2 to 3, reactive hydroxyl, amino and/or thiol groups (preferably hydroxyl groups) as reactive groups and are free from readily hydrolyzable groups such as, for example, ester groups. The compounds in question are, for example, the polyacetals, polythioethers, polycarbonates, polyamides, polysiloxanes and/or polybutadienes containing isocyanate-reactive groups of the type commonly encountered in polyurethane chemistry, but especially polyethers containing hydroxyl groups.

The polyethers containing at least 2, generally 2 to 8, and preferably 2 to 3, hydroxyl groups suitable for use in accordance with the invention are known. They are obtained, for example, by polymerizing epoxides, such as ethylene oxide, propylene oxide, butylene oxide, tetrahydrofuran, styrene oxide or epichlorohydrin on their own, for example, in the presence of Lewis catalysts, such as $BF_3$, or by the addition of these epoxides, preferably ethylene oxide and propylene oxide, optionally in admixture or successively, with starter components containing reactive hydrogen atoms, such as water, alcohols, ammonia or amines, for example, ethylene glycol, 1,3- or 1,2-propylene glycol, trimethylol propane, glycerol, sorbitol, 4,4'-dihydroxydiphenyl propane, aniline, ethanolamine or ethylene diamine. Sucrose polyethers and formitol- or formose-started polyethers may also be used in accordance with the invention. In many cases, it is preferred to use polyethers of the type predominantly containing primary OH-groups (up to 90% by weight, based on all the OH-groups present in the polyether).

Polybutadienes containing OH—, NH— and/or SH-groups are also suitable for use in accordance with the invention (cf. *Progress Organic Coatings*, Vol. 7 (3), 289–329 (1979)).

Suitable polyacetals are, for example, the compounds obtainable from glycols, such as diethylene or triethylene glycol, 4,4'-dihydroxy ethoxy diphenylmethane, hexane diol and formaldehyde. Polyacetals suitable for use in accordance with the invention may also be produced by the polymerization of cyclic acetals, such as trioxane, for example.

Suitable polycarbonates containing hydroxyl groups are known and may be obtained, for example, by reacting diols, such as 1,3-propane diol, 1,4-butane diol and/or 1,6-hexane diol, di-, tri- or tetraethylene glycol or thiodiglycol, with diaryl carbonates, for example, diphenyl carbonate or phosgene (see German Auslegeschrift Nos. 1,694,080; 1,915,908 and 2,221,751 and German Offenlegungsschrift No. 2,605,024).

The polyamides used include, for example, the predominantly linear condensates obtained from polybasic saturated or unsaturated carboxylic acids or their anhydrides and polyfunctional saturated or unsaturated diamines, polyamines and mixtures thereof.

Among the polythioethers, reference is made, in particular, to the condensation products of thiodiglycol on its own and/or with other glycols.

Polyhydroxyl compounds already containing urethane or urea groups and optionally modified natural polyols may also be used. Addition products of alkylene oxides with phenol-formaldehyde resins or even with urea-formaldehyde resins may also be used in accordance with the invention.

Before they are used, the polyhydroxyl compounds described above may be modified in various ways. Thus, it is possible to condense a mixture of different polyhydroxyl compounds by etherification in the presence of a strong acid to form a relatively high molecular weight polyol which is made up of various segments joined by ether bridges. It is also possible to introduce amide groups into the polyhydroxyl compounds.

According to the invention, it is also possible to use polyhydroxyl compounds containing high molecular weight polyadducts or polycondensates or polymers in finely dispersed or dissolved form. Polyhydroxyl compounds of this type are obtained, for example, by carrying out polyaddition reactions (such as reactions between polyisocyanates and amino functional compounds) or polycondensation reactions (such as between formaldehyde and phenols and/or amines) in situ in the above-mentioned compounds containing hydroxyl groups. Processes of this type are described, for example, in German Auslegeschrift Nos. 1,168,075 and 1,260,142 and in German Offenlegungsschrift Nos. 2,324,134; 2,423,984; 2,512,385; 2,513,815; 2,550,796; 2,550,797; 2,550,833; 2,550,862; 2,633,293 and 2,639,254. However, it is also possible in accordance with U.S. Pat. No. 3,869,413 or 2,550,860 to mix an aqueous polymer dispersion with a polyhydroxyl compound and subsequently to remove the water from the mixture.

Polyhydroxyl compounds modified by vinyl polymers of the type obtained, for example, by polymerizing styrene and acrylonitrile in the presence of polyethers (U.S. Pat. Nos. 3,383,351; 3,304,273; 3,523,093; 3,110,695; German Auslegeschrift No. 1,152,536) or polycarbonate polyols (German Pat. No. 1,769,795 or U.S. Pat. No. 3,637,909) are also suitable for the process according to the invention. Plastics characterized by particularly good flameproof properties are obtained by using polyether polyols which have been modified in accordance with German Offenlegungsschrift Nos. 2,442,101; 2,644,922 and 2,646,141 by graft polymerization with vinyl phosphonic acid esters and, optionally, acrylonitrile, methacrylonitrile, acrylamide, methacrylamide or OH-functional acrylic or methacrylic acid esters. Polyhydroxyl compounds into which carboxyl groups have been introduced by radical graft polymerization using unsaturated carboxylic acids and, optionally, other olefinically-unsaturated monomers (German Offenlegungsschrift Nos. 2,714,291; 2,739,620 and 2,654,746) may be used with particular advantage in combination with mineral fillers.

In many cases, polyurethane plastics having significantly improved mechanical properties are obtained where modified polyhydroxyl compounds of the type described above are used as starting component in the polyisocyanate polyaddition process.

Representatives of these compounds which are suitable for use in accordance with the invention are described, for example, in *High Polymers*, Vol. XVI, "Polyurethanes, Chemistry and Technology" by Saunders-Frisch, Interscience Publishers, New York, London, Vol. I, 1962, pages 32–42 and pages 44–54 and Vol. II, 1964, pages 5–6 and 198–199 and in Kunststoff-Handbuch, Vol. VII, Vieweg-Hochtlen, Carl-Hanser-Verlag, Munich, 1966, for example, on pages 45–71. It is, of course, possible to use mixtures of the above-mentioned compounds, such as polyethers, containing at least two isocyanate-reactive hydrogen atoms and having a molecular weight of from 4000 to 12,000.

Other starting components which may be used in the production of the NCO-prepolymers used in the process according to the invention are compounds containing at least two isocyanate-reactive hydrogen atoms and having a molecular weight in the range of from 18 to 399 and preferably in the range of from 60 to 399. In this case too, the compounds in question are understood to be water and/or compounds containing hydroxyl groups and/or compounds containing amino groups and/or compounds containing thiol groups, preferably compounds containing hydroxyl groups, of the type known as chain-extending or crosslinking agents in polyurethane chemistry. These compounds generally contain from 2 to 8, and preferably from 2 to 4, isocyanate-reactive hydrogen atoms. In this case too, it is possible to use mixtures of different compounds containing at least two isocyanate-reactive hydrogen atoms and having a molecular weight in the range of from 18 to 399.

Examples of compounds such as these include water, ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane and pentaerythritol. Additional examples include quinitol, mannitol and sorbitol, dianhydrosorbitol and dianhydromannitol, castor oil, di-, tri- and tetraethylene glycol, di-, tri-, and tetrapropylene glycol, dibutylene glycol and higher polyethylene, polypropylene or polybutylene glycols having a molecular weight of up to 399, 4,4'-dihydroxydiphenyl propane, dihydroxy ethyl hydroquinone, ethanolamine, diethanolamine, N-methyl diethanolamine, triethanolamine and 3-aminopropanol.

Other suitable low molecular weight polyols include the mixtures of hydroxy aldehydes and hydroxy ketones ("formose") and the polyhydric alcohols ("formitol") obtained therefrom by reduction, such as formed in the autocondensation of formaldehyde hydrate in the presence of metal compounds as catalysts and compounds capable of enediol formation as cocatalysts (German Offenlegungsschrift Nos. 2,639,084; 2,714,084; 2,714,104; 2,271,186; 2,738,154 and 2,738,512).

Aliphatic diamines suitable for use in accordance with the invention include, for example, ethylene diamine, 1,4-tetramethylene diamine, 1,6-hexamethylene diamine, 1,12-dodecamethylene diamine and mixtures thereof, 1-amino-3,3,5-trimethyl-5-amino-methylcyclohexane ("isophorone diamine"), 2,4- and 2,6-hexahydrotolylene diamine and mixtures thereof, perhydro-2,4'- and -4,4'-diaminodiphenylmethane, p-xylylene diamine, bis-(3-aminopropyl)-methylamine, diaminoperhydroanthracenes (German Offenlegungsschrift No. 2,638,731) and cycloaliphatic triamines according to German Offenlegungsschrift No. 2,614,244. Hydrazine and substituted hydrazines, for example, methyl hydrazine, may also be used in accordance with the invention.

Examples of aromatic diamines include the diamines containing ether groups according to German Offenlegungsschrift Nos. 1,770,525 and 1,809,172 (U.S. Pat. Nos. 3,654,364 and 3,736,295), 2-halogen-1,3-phenylene diamines optionally substituted in the 5-position (German Offenlegungsschrift Nos. 2,001,772; 2,025,896 and 2,065,869) and 3,3'-dichloro-4,4'-diaminodiphenylmethane. Additional examples include tolylene diamine, 4,4'-diaminodiphenylmethane, 4,4'-diaminodiphenyldisulfides (German Offenlegungsschrift No. 2,404,976), diaminodiphenyldithioethers (German Offenlegungsschrift No. 2,509,404), aromatic diamines substituted by alkyl thio groups (German Offenlegungsschrift No. 2,638,760), aromatic diamines containing sulfonate or carboxylate groups (German Offenlegungsschrift No. 2,720,166) and the high melting diamines described in German Offenlegungsschrift No. 2,635,400. Examples of aliphatic-aromatic diamines are the aminoalkyl thioanilines according to German Offenlegungsschrift No. 2,734,574.

Other compounds which may be used in the production of the NCO-compounds suitable for use in the process according to the invention are organofunctional polysiloxanes containing two terminal isocyanate-reactive groups and structural units corresponding to the formula, $-O-Si(R)_2-$, in which R is a $C_1-C_4$-alkyl radical or a phenyl radical, but preferably a methyl radical. According to the invention, suitable starting materials are both the known pure polysiloxanes containing terminal organofunctional groups and also the known siloxane polyoxyalkylene copolymers containing terminal organofunctional groups. Organofunctional polysiloxanes suitable for use as starting material in accordance with the invention are described, for example, in German Auslegeschrift Nos. 1,114,632; 1,190,176; 1,248,287 and 2,543,638 and German Offenlegungsschrift Nos. 2,356,692; 2,445,648; 2,363,452; 2,427,273; and 2,558,523. The carbofunctional terminal groups are preferably aliphatic $C_1-C_6$-hydrocarbon residues, optionally containing heteroatoms, such as, in particular, oxygen, and containing at least one hydroxyl, mercapto or primary or secondary amino group. Preferred carbofunctional groups include primary and secondary hydroxyl groups and also primary and secondary amino groups and particularly preferred starting compounds are those containing terminal primary hydroxyl groups. These carbofunctional groups may be present in the starting materials, for example, in the form of the following carbofunctional radicals: $-CH_2OH$, $-(CH_2)_4OH$, $-CH_2-O-CH_2-CH_2-OH$, $-CH_2-S-CH_2-CH_2-OH$, $-CH_2-S-CH_2-CHOH-CH_2OH$, $-CH_2SH$, $-CH_2-S-CH_2-CH_2-SH$, $-CH_2-NH_2$, $-(CH_2)_4NH_2$, $-CH_2-NH-C_4H_9$ or $-CH_2-NH-C_6H_{11}$.

The organo-functional polysiloxanes contain at least 2, and preferably from 6 to 30, structural units corresponding to the formula, $-O-Si(R)_2-$, and have a molecular weight of from 194 to 12,000, and preferably a molecular weight of from 400 to 3000. As already mentioned, polyoxyalkylene units, particularly polyoxyethylene and/or polyoxypropylene units, may be present in the chain in addition to the above-mentioned structural units in the polysiloxanes suitable for use in accordance with the invention.

The organofunctional polysiloxanes suitable for use in accordance with the invention may be obtained by known processes. For example, the particularly suitable hydroxymethyl polysiloxanes may be prepared by the direct reaction of bromomethyl polysiloxanes with alcoholic potassium hydroxide. 4-aminobutyl polysiloxanes are obtained by hydrogenation of the readily-obtainable nitriles while aminomethyl siloxanes are obtained by aminating the halogen methyl silicon compounds with ammonia or primary amines.

In many cases, the functional groups are first introduced into low molecular weight siloxanes. The products thus obtained are then converted into relatively high molecular weight polysiloxanes by the known equilibration reaction.

Suitable organofunctional polysiloxanes are, for example, compounds corresponding to the following formula, $$H-X-Y-(Si(R)_2-O)_{\overline{n}}Si(R)_2-Y-X-H$$

wherein
R is a $C_1-C_4$-alkyl radical or a phenyl radical, but preferably a methyl radical;
X represents $-O-$, $-R'-$ (wherein R' is an aliphatic or cycloaliphatic hydrocarbon radical containing up to 6 carbon atoms), or $-S-$;
Y represents an alkylene radical containing from 2 to 4 carbon atoms or an oxyalkylene or polyoxyalkylene radical (where alkylene represents ethylene and/or propylene) containing up to 50 oxyalkylene units of the type obtained by removing a terminal oxygen atom; and
n is an integer of from 1 to 100, and preferably of from 5 to 29.

The following compounds, for example, are particularly suitable organofunctional polysiloxanes for the purposes of the invention:

$HO-CH_2-Si(CH_3)_2-O[Si(CH_3)_2-O]_{12}-Si(CH_3)_2-CH_2OH;$ $HO-\underset{\underset{CH_3}{|}}{CH}-CH_2-[Si(CH_2)_3-O]_{11}-Si(CH_3)_2-CH_2-O-\underset{\underset{CH_3}{|}}{CH}-CH_2-OH;$ $HO-CH_2-Si(CH_3)_2-O-Si(CH_3)_2-OH;$
$HO-CH_2-Si(CH_3)_2-O-[Si(CH_3)_2-O]_{60}-Si(CH_3)_2-CH_2-OH;$ or $n\text{-}C_4-H_9-NH-CH_2-Si(CH_3)_2-O-[Si(CH_3)_2-O]_{18}-\underset{\underset{CH_2-NH-n\text{-}C_4H_9}{|}}{Si(CH_3)_2}$ The organo polysiloxanes particularly preferred for use in accordance with the invention correspond to the general formula, $$HO-CH_2-\underset{\underset{CH_3}{|}}{\overset{\overset{CH_3}{|}}{Si}}-\left[O-\underset{\underset{CH_3}{|}}{\overset{\overset{CH_3}{|}}{Si}}\right]_n-CH_2-OH,$$

wherein
n = 5 to 29.

They are obtained in a known manner by the equilibration of 1,1,3,3-tetramethyl-1,3-hydroxymethyl disiloxane corresponding to the formula, $$HO-H_2C-\underset{\underset{CH_3}{|}}{\overset{\overset{CH_3}{|}}{Si}}-O-\underset{\underset{CH_3}{|}}{\overset{\overset{CH_3}{|}}{Si}}-CH_2-OH,$$

with octamethyl cyclotetrasiloxane in the presence of sulfuric acid, or by the process according to German Auslegeschrift No. 1,236,505.

The NCO-prepolymers containing free isocyanate groups are obtained in a known manner by reacting the reagents either in the melt or in solution. In either case, the equivalent ratio of NCO-groups to active hydrogen atoms (preferably OH-groups) is greater than 1, and in general should be between 1.5:1 and 2.8:1, but it is, of course, possible to use an even larger excess of polyisocyanate.

The preadducts are generally oily to wax-like in consistency, depending on the starting components selected. If the NCO/OH-ratio amounts to more than 2, nonextended preadducts are mostly obtained whereas NCO/OH-ratios of less than 2 result in an increase in the average molecular weight of the preadducts. As already explained, it is also possible to use low molecular weight polyols as chain extending agents in addition to relatively high molecular weight starting compounds in the production of the prepolymers. In this case also, relatively high molecular weight preadducts are still obtained.

If the products according to the invention are to be obtained with a minimal content of monomeric polyamines, the NCO-prepolymers obtained have to be subjected to distillation to remove monomeric polyisocyanates. This may be accomplished with advantage by means of a thin-layer evaporator.

Preferred prepolymers for the process according to the invention are prepolymers which have beein obtained from relatively high molecular weight polyether glycols, optionally using chain-extending agents of the type described above, and aliphatic and/or aromatic diisocyanates, in an equivalent ratio of from 1:1.5 to 1:2.8 and, more particularly, in an equivalent ratio of from about 1:1.5 to 1:2.

The NCO-prepolymers used have NCO-contents of from 0.5% to 30% by weight, preferably from 1.2 to 25% by weight, and, more preferably, from 1.9 to 15% by weight.

However, so-called "semi-prepolymers", i.e., mixtures of NCO-prepolymers with other free polyisocyanates which have an even higher NCO-content (for example, up to 40% by weight of NCO), may also be used in the process according to the invention. In most cases, however, this is not practicable on economic grounds, in addition to which the monomeric amines formed from the monomeric polyisocyanates cause problems in numerous applications.

The compounds containing free NCO-groups in the form of their modified isocyanates (generally free from urethane groups) or in the form of their NCO-prepolymers (containing urethane groups) or their "semi-prepolymers" have a total NCO-group content of from 0.5 to 40% by weight, preferably from 1.2 to 25% by weight and, more preferably, from 1.5 to 15% by weight of NCO.

It is, of course, possible additionally to add monomeric, unmodified polyisocyanates to the compounds containing free NCO-groups, further increasing the NCO-content of the mixture, although this is by no means a preferred process because the polyamines on which the monomeric polyisocyanates are based are directly obtained by standard methods. In cases such as these, there would be virtually no point in adopting the indirect route involving isocyanates. However, it is possible by the process according to the invention, economically and easily, to obtain modified polyamines of the type which are either impossible or far too difficult to produce by conventional synthesis techniques, for example, cyanurate triamines or biuret polyamines.

Polyamines containing aromatic and/or aliphatic primary amino groups may be obtained by the process according to the invention from the compounds containing free NCO-groups by the NCO-hydrolysis reaction. Accordingly, these polyamines contain urethane and/or urea and/or uretdione and/or cyanurate and/or biuret groups and, optionally, ether and/or acetal and/or carbonate and/or thioether and/or dialkyl siloxane groups and/or the residues of polybutadienes which existed in the NCO-compounds. However, additional bonds may also be formed through secondary reactions (for example, urea groups from already-hydrolyzed fractions and fresh NCO-compounds during the hydrolysis reaction).

The quantity of $NH_2$-groups (maximally) present in the polyamines corresponds to the quantity of NCO-groups in the NCO-compounds, i.e., to between about 0.19 and 20.2% by weight $NH_2$, preferably to between 0.47 and 13.1% by weight $NH_2$ and, more preferably, to between 0.57 and 6.13% by weight $NH_2$.

The process according to the invention is preferably used for producing aromatic polyamines from aromatic NCO-compounds.

In general, the NCO-compound used as starting component in the process according to the invention is employed without a solvent. However, it is also possible, for example, in order to reduce viscosity, to use solutions of NCO-compounds, particularly NCO-prepolymers, in NCO-inert solvents which are preferably miscible with water. Suitable solvents for this purpose include, for example, dimethoxy ethane, diethylene glycol dimethyl ether, dioxane or tetrahydrofuran. Solvents less suitable for this purpose include, for example, hydrocarbons, chlorinated hydrocarbons and lower aromatic hydrocarbons and/or nitrated aromatic hydrocarbons. The NCO-compounds are preferably used in the form of solutions in the above-mentioned solvents in cases where the NCO-prepolymers are solid or infusible, substantially infusible or highly viscous at temperatures in the range from 20° to 80° C.

In those cases where the NCO-compounds are used in dissolved form, the preferred temperature is in the range of from 20° to 40° C., but in no case shall the maximum temperature equal or exceed the boiling point of the solvent in use.

Where liquid NCO-compounds are used without a solvent in the process according to the invention, they advantageously have a temperature in the range of from 20° to 80° C. and preferably in the range of from 40° to 70° C. in order to keep their viscosity low.

Where the NCO-compounds are used in the form of solutions, it is possible to use, for example, from 1 to 400 parts of NCO-prepolymer to 100 parts of solvent.

The NCO-compounds and the basic medium should preferably be mixed at as low a temperature as possible and the mixed reaction solution should be kept at as low a temperature as possible in order to rule out secondary reactions as far as possible. The temperature in the reaction mixture of the components should be below 100° C., preferably below 70° C. and most preferably below 40° C.

Accordingly, the temperature of the basic, low viscosity medium is preferably selected as low as possible before the reaction, for example, in the range of from −25° to +40° C., and preferably in the range of from 0° to 25° C. In addition, the reaction mixture may be further cooled during the reaction in order to keep the reaction temperature in the optimal range. However, the permitted reaction temperatures are determined by the way in which mixing and the reaction are carried out.

In the process according to the invention, an aqueous mixture or solution of bases is generally used as the medium according to the invention, with the minimal quantity of water present being the stoichiometricallynecessary quantity of 1 mole of water per mole of NCO. Suitable strong bases include, for example, alkali hydroxides, alkaline earth hydroxides and alkaline earth oxides, low molecular weight alkali silicates and alkali aluminates and tetraalkylammonium hydroxides, such as tetramethylammonium hydroxides. Potassium and sodium hydroxides are particularly preferred. The strong bases may be used in a concentration of, for example, one part of the base to between 1 and 100 parts of water.

It is also possible when an aqueous mixture or solution of bases is used, although less preferred, to use other organic solvents (for example, in ratios of from 10 to 1000 parts of co-solvent per 100 parts of water) which are preferably miscible with water, such as dioxane, tetrahydrofuran and dimethoxy ethane.

The reaction of the NCO-compounds with the bases may then be carried out in various ways. In one batch-type embodiment, the compound containing NCO-groups is slowly stirred into the basic medium. This may be done either by means of a dropping funnel or, for example, by machine injection using a nozzle, in which case intensive stirring should be provided for effective dispersion. The period of time over which the NCO-compounds are added is dependent upon the heat generated by the reaction, provision possibly having to be made in the form of cooling to ensure that the temperature of the reaction medium to which the NCO-compounds are added generally does not exceed the temperature limits mentioned above, i.e., in the case of the batch-type embodiment, approximately 40° C., and preferably 20° C. This is particularly important in the case of trifunctional and higher NCO-prepolymers, for example, whereas in the case of a difunctional prepolymer a brief increase in the temperature to around 60°–70° C. is tolerable. In general, the NCO-compounds are introduced over a period of from about 5 to 140 minutes, and preferably over a period of from 30 to 120 minutes.

The volume of liquid initially introduced should normally be approximately between one-half and one-fourth of the total liquid to be added, although this obviously does not apply when solid NCO-prepolymers are added in finely dispersed form which, although possible, is not preferred.

In a continuous embodiment which is particularly suitable for working on a larger scale, NCO-compounds (optionally in solution) and the aqueous base are separately delivered to a common reaction zone, intensively mixed (for example, by means of a flow mixer), reacted and rapidly discharged from the mixing zone. The components may be metered, for example, by means of graduated dropping funnels, a piston-type and/or diaphragm-type metering pump or by any other type of metering unit. In the case of continuous metering, it is preferred to take as little time as possible (seconds or fractions of a second) in mixing and reacting both components using a suitable, optionally mechanical, mixer and in discharging the reaction product from the reaction zone.

As for the flow-type mixers (which may be heated or cooled) that are suitable for use in accordance with the invention, a distinction is drawn between static mixers comprising fixed mixing elements and the preferred dynamic mixers comprising moving mixing elements on the rotor/stator principle. In the case of static mixers, the necessary mixing energy is supplied by the pumps, whereas in the case of dynamic mixers a separate motor drives the rotor. In either case, the conversion of the isocyanate groups also depends upon the energy applied and the shear forces correspondingly generated, e.g., upon the fine dispersion of the NCO-compound in the basic medium.

The static mixers may be divided into the following types:

(a) mixers comprising simple mixing elements (for example, coils, as in the Static Mixer ®, manufactured by the Kenics Corp., USA);

(b) multichannel mixers (for example, the AMK-Ross ISG-Mixer, manufactured by the Aachener Misch- und Knetmaschinen-Fabrik, Federal Republic of Germany);

(c) so-called packing mixers such as, for example, the static mixer manufactured by Sulzer AG (Winterthur, Switzerland) and the BMK-mixer, manufactured by Bayer AG, Federal Republic of Germany; and (d) mixing nozzles, for example, of the type manufactured by the Lechler Company (Stuttgart, Federal Republic of Germany) and the mixing chambers in the HK-machines, manufactured by the Hennecke Company (Birlinghofen, Federal Republic of Germany), into which the starting products are sprayed under high pressure (countercurrent injection), or in the Intermixer ®, manufactured by the Sonic Company (Connecticut, USA), in which the material to be dispersed is sprayed onto a moving tongue which is thus set vibrating (approximately 500 c/s), subjecting the product flowing through it to intensive dispersion and mixing.

Suitable dynamic mixers for use in the process according to the invention include, for example, the flow-type mixers manufactured by the Ekato RMT Company (Schopfheim, Federal Republic of Germany), the Lightnin Company (Neu-Isenburg, Federal Republic of Germany) and the Hennecke Company (barbed stirrer) which, like the known impeller homogenizers, for example, of the Supratron ® type, manufactured by Messrs. Supratron Auer & Zucker OHG (Norf, Federal Republic of Germany) or the Dispax-Reaktor ®, manufactured by Messrs. Janke & Kunkel KG (Staufen, Federal Republic of Germany), function on the stator-rotor principle, but cannot be used as transporting elements. The energy required for dispersion ranges from between 1 to more than 10 kW/liter of mixer capacity, depending on the required degree of dispersion, the type of mixer used and the viscosity of the starting materials.

In general, the reaction components are delivered to the flow mixer in low viscosity form and at their lowest possible temperatures, preferably at around −25° to 40° C. (which may be accomplished by heating or cooling to the desired temperatures). Under the effect of the intense shearing forces generated where a dynamic mixer is used, the reaction temperatures prevailing in the mixing zone might rise to a considerable extent—possibly to between 50° and 150° C., depending upon the heat of reaction generated. In general, however, it is best to keep the temperature below 100° C. (if necessary, by cooling the mixing unit), preferably below 60° C., and more preferably to between 20° and 40° C. By virtue of the intensive mixing, rapid reaction and discharge of the reaction mixture formed, the temperature is not quite so critical as in the batch-type process. If other co-solvents are used, such as isopropanol or t-butanol, the temperature has to be kept below their boiling point if it is lower than that of water. The quantities of the alkali, alkaline-earth and tetraalkylammonium hydroxides preferably used as bases amount to between 0.3:1 and 2:1, based on one NCO-group.

In cases where it is intended to obtain a produce with very little, if any, pre-extension through urea groups, the $OH^\theta$:NCO ratio will amount to between 2:1 and 1.01:1 and, more preferably, to between 1.8:1 and 1.1:1, guaranteeing that an excess of base will be left after all the NCO-groups have completely reacted.

It is also possible, however, to use smaller quantities of bases when, for certain applications, pre-extensions of the polyamines through urea groups is harmless or even desirable. A ratio of from 0.3:1 to 1.0:1.0, and preferably from 0.6:1 to 1.0:1.0, enables the reaction to be satisfactorily carried out in those cases.

Higher or lower $OH^\theta$/NCO-ratios are, of course, possible too. With a ratio of less than 0.3:1, however, working up will become extremely laborious due to the high polymer characteristics of the product and an $OH^\theta$:NCO-ratio of greater than 2:1 does not afford any advantages.

Various additives may be used to facilitate the reaction of the isocyanate groups with the aqueous base. Thus, one or more commercial emulsifiers may be added for homogenization, for example, in quantities of from 0.01 to 1 part by weight per 100 parts of reaction mixture.

It is also possible to add catalytically-active compounds in order to increase the reaction velocity. Catalytically-active compounds of this type include, for example, metal catalysts of the type generally known in polyurethane chemistry and employed in the production of polyurethane foams to accelerate the NCO/water reaction.

After all the NCO-groups have completely reacted, it is possible, although generally not necessary and actually less preferred, to add water or an organic water-miscible solvent before the further treatment. Suitable solvents of this type include lower alcohols, such as methanol, ethanol, isopropanol and ethers, such as tetrahydrofuran, dioxane, dimethoxy ethane or diethylene glycol dimethyl ether.

According to the invention, the compounds containing carbamate groups obtained by mixing the NCO-compounds with the basic medium are directly converted into compounds containing amino groups either by heat treating the reaction mixture comprising compounds containing carbamate groups for the purpose of recovering the amine (Method A) or by extracting the amine with a solvent (Method B). Both Methods A and B may be carried out either continuously or in batches. It is also favorable in both methods, but particularly in Method A, to apply a vacuum to promote the decomposition of the compounds containing carbamate groups. And it is also possible to combine both methods.

Method A (Heat Treatment)

Heat treatment of the reaction mixture at temperatures of up to about 200° C. results in hydrolysis of the carbamate groups into amino groups and salts of carbonic acid, corresponding polyamines being formed from the compounds containing carbamate groups. The heat treatment may be carried out either continuously or in batches and it may be carried out in the absence (Method A1) or presence (Method A2) of a vacuum.

In one batch-type embodiment of the process according to the invention, which is preferably carried out in the same reaction vessel as, and immediately after, the production of the compounds containing carbamate groups, the reaction mixture comprising compounds containing carbamate groups is heated for up to 360 minutes, preferably for 5 to 180 minutes and, more preferably, for 30 to 120 minutes. It is heated for that period to $\geq 40°$ C., preferably to $\geq 60°$ C., more preferably to $\geq 80°$ C. and, at most, to around 200° C. by means of a heat source having a temperature of from 60° to 200° C., and preferably from 100° to 160° C. (such as a steam or an oil bath or by means of passage over heated plates). Heating to a temperature in the range of from about 60° to 100° C. is favorable, and heating to a temperature in the range from 80° to 100° C. is particularly preferred, and may be accomplished by refluxing excess water and any solvent present (optionally in vacuo). Some carbon dioxide may escape during this heat treatment, particularly toward the end of the treament and carbonic acid salts (for example, variously hydrated carbonates such as potassium carbonate, $K_2CO_3$, and hydrogen carbonates of the bases used) are formed during this heat treatment.

If the solvent part of the carbamate-containing reaction mixture subjected to the heat treatment consists either of water or predominantly of water and to a lesser extent of an organic solvent or to a lesser extent of water and to a greater extent of a protic or aprotic dipolar solvent (for example, methanol or dimethyl formamide) having a high salt dissolving power, most of the carbonic acid salt remains in solution during the treatment. If the solvent part of the carbamate-containing reaction mixture subjected to the heat treatment consists of a relatively low percentage of water and a relatively high percentage of solvent having a fairly weak salt dissolving power (for example, n-butanol, i-butanol or tetrahydrofuran), some of the carbonic acid salts may even precipitate and be filtered off.

After the heat treatment, the solvent is distilled off at normal pressure or under a vacuum of, for example, from 0.2 to 950 mbar. The internal temperature depends upon the boiling points and the mixing ratios between the solvents used, and preferably amounts to between 80° and 100° C. In the case of only minor residues of volatile substances, it is best to reduce the temperature to below 100° C. and to apply a vacuum, for example, in the range from 0.01 to 6 mbar, to the mixture.

It is possible to remove residues of water by the addition of a solvent (such as toluene) which forms an azeotrope with water, followed by redistillation, optionally under reduced pressure. The carbonic acid salt is separated off (for example, by filtration, centrifuging, decantation or similar measures), from the liquid polyamine-containing distillation residue which has a temperature of 20° C. or higher, and preferably a temperature in the range of from 60° to 90° C. Separation is preferably carried out using a heatable or nonheatable pressure filter under an excess pressure of, for example, from about 0.5 to 4 bars.

If desired, the filter residue may be extracted (optionally after combination with other filter residues of the same type) with a suitable solvent which dissolves the amine but not the carbonic acid salt, in order to recover minor residues of amine product. Suitable solvents include, for example, halogenated and, in particular, chlorinated alkanes, such as trichloromethane and liquid aromatic hydrocarbons, such as toluene.

Various modifications of the batch embodiment of the process according to the invention may also be carried out. Thus, it is possible, even preferred, to carry out the above-mentioned carbamate-decomposing heat treatment under such conditions that water and any other solvents distill off. The carbamate-containing reaction mixture is heated for about 30 to 480 minutes to a temperature above 40° C., preferably to a temperature above 60° C. and, more preferably, to a temperature above 80° C. by means of a heat source having a temperature of from 60° to 200° C. and preferably from 100° to 160° C., so that the solvent distills off during the heat treatment. This simultaneous heat treatment and distillation may even be carried out under reduced pressure, for example, at 200 to 950 mbar (Method A2). In this case, the reduction in pressure may be carried out gradually and continuously, with the distillation being commenced at normal pressure and completed at around 0.5 mbar.

In another modification, a solvent is added before separation of the polyamine and carbonic acid salt. This may be advisable when the viscosity of the mixture to be filtered under suction is too high, when the carbonic acid salts precipitated are too finely crystalline or when the precipitation of the carbonic acid salt is incomplete. Suitable solvents include, for example, ethers, such as dioxane; lower alkanes, such as pentane or hexane; chlorinated hydrocarbons, such as dichloromethane or trichloroethane; and lower aromatic hydrocarbons, such as toluene and xylenes. After the salt and the amine have been separated, for example, by filtration, the solvent used is distilled off from the amine solution. It is of advantage to use a solvent which, like toluene, for example, is capable of azeotropically removing any remaining water.

In still another modification (A3), subequivalent quantities of acid, according to the equivalents of base used, for example, from 0.01 to 0.99 equivalents of acid per equivalent of basic compounds added, may be mixed with the reaction mixture comprising compounds containing carbamate groups before or during its heat treatment. Suitable acids include, for example, sulfuric acid, hydrochloric acid, phosphoric acid and other acids which do not oxidize under the reaction conditions; strong organic acids such as, for example, formic acid, chloroacetic acid or acetic acid; or other acids, preferably having a strength at least corresponding to acetic acid.

After the solvent has been distilled off, a mixture of carbonic acid salt and, for example, the sulfate, $HSO_4^-$, chloride, phosphate, etc., is filtered off. In this case, too, the temperatures and pressure may be varied within the above-mentioned limits and a suitable solvent may be added before separation.

Carbon dioxide may be introduced with advantage before or at the beginning of the heat treatment. This is particularly advisable when an $OH^\theta/NCO$ ratio of $\geq 1$ has been used. In this case, excess base is converted into a salt of carbonic acid. In other respects, the procedure is as described above.

In yet another modification (A4), a compound which forms substantially insoluble salts with bases in a substantially anhydrous medium may advantageously be added before the heat treatment. This method may be used with advantage for the production of products which show solubility for aqueous or nonaqueous salts of carbonic acid and which have only minimal solubility in the solvents. Suitable compounds which form salts with bases include, preferably, carboxylic acid esters such as, for example, methyl or ethyl esters of formic, acetic, propionic or benzoic acids. They are preferably used in such quantities that all hydroxide ions come in contact with a reactive compound such as, for example, a compound containing ester groups. Although a small excess of these compounds is preferred, it is also possible to use a relatively large excess. The conditions under which heat treatment and working-up are carried out are the same as described above. In addition to the carbonic acid salts, acetates, for example, are precipitated in this case (where acetic acid esters are used) and the alcohol component in distilled off during the working-up process.

A continuous procedure may also be carried out using any of the above-described treatment methods and their modifications. The polyamine is preferably recovered by heat treating the reaction mixture comprising compounds containing carbamate groups after continuous production of the said reaction mixture.

In principle, the continuous procedure comprises passing the said reaction mixture—optionally fluidized by the addition of diluents—through a heating zone, the temperature and dimensions of which determine the necessary duration of the heat treatment. The temperature of the heating zone is selected in such a way that the solvents are at least partly and, preferably, completely evaporated. In this connection, it is even possible to work under reduced pressure, for example, under a reduced pressure of from 0.5 to 950 mbar and preferably under a reduced pressure of from 100 to 800 mbar. The temperature of the heating zone is in the range of from 60° to 200° C., and preferably in the range of from 100° to 160° C., and may differ at various points of the heating zone, although the carbamate mixture to be decomposed should not be heated beyond 200° C. One simple embodiment of a heating zone of this type is, for example, a thin-layer evaporator.

If the heating zone does not contain any integrated filters or other means for separating off the salt fractions, the resulting amine/salt mixture is separated by known methods of the type discussed in the description of the batch procedure, above.

Method B (Extraction With Solvents)

The compounds containing carbamate groups may also be converted into the corresponding compounds containing amino groups (polyamines according to the invention) by treatment of the reaction mixture comprising compounds containing carbamate groups with a suitable solvent. The polyamines resulting from an equilibrium scission are surprisingly extracted so quantitatively into the organic phase, that under $CO_2$-evolution the whole carbamate in the aqueous phase will be converted to the polyamines, preferably when rising the temperature, e.g. up to 40° C.

Water-immiscible organic solvents suitable for this method include, in particular, solvents of the type which are not solvents for the compounds containing carbamate groups or for the carbonic acid salts formed but, on the other hand, are effective solvents for the amines formed. Solvents of this type include, for example, dichloromethane, trichloromethane, tetrachlormethane, cyclohexane, methylcyclohexane, pentane, hexane, benzene and toluene. Dichloromethane is particularly suitable.

From 10 to 1000 parts of the said solvent, preferably from 20 to 500 parts and, more preferably, from 80 to 150 parts are used per 100 parts of water in the reaction mixture comprising compounds containing carbamate groups. The treatment is preferably carried out at 20° to 40° C., although the method may even be carried out at a relatively high temperature, the highest temperature at which the method can be carried out being the temperature which corresponds to the boiling temperature of the solvent used. The necessary treatment and extraction time is generally between about one hour and three days and preferably between two hours and one day at room temperature, becoming shorter at higher treatment temperatures. The end of the reaction is reflected in the fact that the aqueous and the organic phase are visually clear and the organic phase no longer gives evolution of $CO_2$-gas on the addition of an acid as an indicator (ethanol, for example, having been added beforehand to homogenize the phases).

The reaction mixture is best stirred during the reaction and on completion of the reaction, the two phases are mechanically separated from one another. The organic phase is then freed from the organic solvent by distillation with residual quantities of volatile substances being removed, for example, at 0.1 mbar/100° C.

It is also possible, in principle, to use water-miscible solvents, provided they are at least poorer solvents for salts of carbonic acid than is water. Solvents of this type include, for example, methanol; ethanol; n-propanol; i-propanol; n-butanol; i-amyl alcohol; cyclic ethers, such as dioxane or tetrahydrofuran; water-soluble acyclic ethers, such as diethylene glycol dimethyl ether; and ketones, such as acetone or methyl ethyl ketone. Using these water-miscible solvents, a two-phase system is also obtained after conversion of the compound containing carbamate groups into a polyamine. The carbonic acid salt is enriched in the aqueous phase and the amine is enriched in the organic phase. By virtue of the mutual miscibility, however, the aqueous phase contains fractions of the organic solvent and the amine, and the organic phase contains fractions of salts and water, so that the organic phase has to be filtered once again after removal of the solvent by distillation.

It is additionally possible to use a mixture of several organic solvents. Accordingly, the solvents are preferably selected in such a way that at least one solvent preferably dissolves the compound containing carbamate groups in addition to the amine, while at least one other solvent preferably dissolves the amine only. Lower alcohols, for example, may be used for the first solvent, while chlorinated aliphatic hydrocarbons, for example, may be used for the second solvent.

Extraction may be carried out at normal pressure, under reduced pressure and under excess pressure, with extraction at normal pressure being preferred. The extraction process may also be modified by mixing the reaction mixture comprising compounds containing carbamate groups before or during extraction with subequivalent quantities of acids, based on the quantity of bases used, i.e., approximately 0.01 to 0.99 equivalents of acid per equivalent of bases. In the same way as the introduction of carbon dioxide, this modification is always particularly suitable when an $OH^\theta/NCO$ ratio of greater than 1:1 has been used. The standard modifications of Method A may be adopted in this case, too.

This batch-type extraction process may be carried out using standard laboratory equipment, for example, by stirring the mixture containing the extraction solvents in a flask until visually clear phases are formed and subsequently transferring the phases to and separating them in a separation funnel. However, it is also possible to use standard extractors for liquid/liquid mixtures of the type available for the use with extractants of higher or lower specific gravity than the product to be extracted. Accordingly, extraction may also be carried out continuously.

For example, if the solvent used (which does not dissolve the compounds containing carbamate groups) forms a phase of relatively low specific gravity with the polyamine, the following procedure may be adopted:

A vessel is continuously filled with a reaction mixture containing carbamate groups and a solvent of the type defined above is introduced from below with stirring. The solvent dissolves the free amine and is removed from the extractor, for example, through an overflow, freed from amine by distillation and reintroduced into the extractor. The salt solution of higher specific gravity, such as an aqueous salt solution, is run off from the bottom of the reaction vessel and, after the addition of sodium hydroxide, is freed from the carbonic acid salt which then crystallizes and is recycled for reaction with the NCO-compounds.

Both in the continuous process and also in the bath process, the amine may readily be obtained in pure form from the organic amine solutions by distillation of the solvents, optionally under reduced pressure. However, this is unnecessary in many cases, because amines dissolved in an organic solvent are used for numerous applications, for example, in the production of coatings on textile fabrics, leather and other sheet-form materials. In cases such as these, it is best to use a solvent of the type which is also best used in the subsequent application of the polyamines in the synthesis of high molecular weight polyurethanes or polyurethane ureas.

The polyamines obtained in accordance with the invention after removal of the solvents are generally colorless to pale yellow, medium-viscosity to highly viscous and, optionally, relatively high-melting products. By virtue of their low vapor pressure, the polyamines obtained in accordance with the invention are preferably used as reactants for optionally blocked polyisocyanates in the production of polyurethanes or polyurethane ureas. They may also be used as reactants for optionally cellular polyurethane plastics or polyurethane foams, for which purpose they may even be combined with other low molecular weight compounds (molecular weight from 32 to 399) and/or with relatively high molecular weight compounds (molecular weight 400 to approximately 12,000) containing isocyanate-reactive groups.

Suitable starting components for the production of polyurethane plastics were mentioned earlier in connection with production of the prepolymer and are also mentioned in German Offenlegungsschrift Nos. 2,302,564; 2,432,764 (U.S. Pat. No. 3,903,679); 2,639,083; 2,512,385; 2,513,815; 2,550,796; 2,550,797; 2,550,833; 2,550,860 and 2,550,862 which also mention auxiliaries and additives of the type which may optionally be used in the production of polyurethanes.

The present invention also relates to the production of polyurethanes (or polyurethane ureas) using the polyamines produced in accordance with the invention. These polyurethanes or polyurethane ureas may be applied from melts, solutions, dispersions or in the form of a mixture of reactive components, for example, for elastomers, coatings and filaments.

Further applications for the polyamines produced in accordance with the invention include, for example, their use as coupling components for diazo dyes, as hardeners for epoxide and phenolic resins and in any other known reactions involving amines, such as amide-forming or imide-forming reactions and the like.

The process according to the invention is illustrated by the following Examples in which the quantities quoted represent parts by weight and percentages by weight, unless otherwise indicated.

PRODUCTION EXAMPLES

EXAMPLE 1

Production of the Carbamate 306 g of a 50% KOH-solution (2.73 moles), 2.1 liters of water and 2.3 g of an emulsifier (Mersolat ®H, Bayer AG, D-5090 Leverkusen) are initially introduced into a reaction vessel and the solution is externally cooled by means of an ice bath. 2.25 kg of an NCO-prepolymer produced from 2,4-tolylene diisocyanate and a polypropylene glycol ether (average molar weight 2000) and having an NCO-value of 3.4% ($OH^\ominus$:NCO=1.5) are then added over a period of 90 minutes, the NCO-prepolymer having been heated to 60° C. An internal temperature of 18° to 22° C. is maintained during the addition of the NCO-prepolymer, the reaction mixture being subsequently stirred for 20 minutes at that temperature.

Production of the Amine (Using Method A1—Thermal Decomposition in the Absence of a Vacuum)

1 kg of the above carbamate reaction mixture is heated to its boiling point by means of a bath heated to 150° C. The evolution of gas begins when the boiling temperature is reached, producing 4.0 liters of carbon dioxide over the one-hour heating period. Thereafter, the water is distilled off at 100° C./27 mbar and 100° C./0.7 mbar and the carbonic acid salt is filtered off from the amine-containing end product.

| Product Data | |
|---|---|
| Yield | 475 g (97.8% of theoretical) |
| NH-number | 43.9, 44.2 (mg KOH/g) |
| Acid number | <0.05 (mg KOH/g) |
| Molar weight | 2700 |
| Viscosity $\eta_{75}$ | 422 mPa · s |
| Water Content (Karl Fischer) | 0.09% |
| Total Nitrogen Content (kjieldal) | 2.46% |
| Primary $NH_2$ (titration with ($HClO_4$)) | 1.08% |

EXAMPLE 2

Production of the Amine (Using Method A1)

A vigorous stream of carbon dioxide is passed, during a period of 30 minutes, through 1 kg of the carbamate reaction mixture of Example 1. The mixture is stirred for 2 hours at a bath temperature of 150° C., the evolution of gas only beginning when the boiling temperature is reached with 6.12 liters of carbon dioxide being given off. The water is then distilled off at 100° C./20 mbar and then at 100° C./0.13 mbar and the carbonic acid salt is filtered from the amine-containing end product.

| Product Data | |
|---|---|
| Yield | 484 g (100% of theoretical) |
| NH-number | 44.3, 44.4 |
| Acid number | 0.2 |
| Molar weight | 2600 |
| Viscosity $\eta_{75}$ | 420 mPa · s |
| Water Content (Karl Fischer) | 0.08% |
| Total Nitrogen Content (kjieldal) | 2.46% |
| Primary Nitrogen ($HClO_4$) | 1.08% |

EXAMPLE 3

Production of the Carbamate

A solution of 68 g of a 50% KOH solution, 470 ml of water and 0.5 g of Mersolat ®H is initially introduced into the reaction vessel. 0.5 kg of a thin-layered NCO-prepolymer (which is produced by reacting an excess of tolylene diisocyanate with a 1:1 mixture of a propylene glycol and a trimethylolpropane-started PO/EO-mixed (80/20) polyether polyol which has an average functionality of 2.5 and an average OH number of 56 and which has an NCO-content of 3.4%) which has been heated to 50° C. is added dropwise over a period of 30 minutes, followed by stirring for 15 minutes, the internal temperature being kept at 20° to 22° C.

Production of the Amine (Using Method A1)

In the production of the amine carried out in the same way as in Example 1, 5.3 liters of carbon dioxide were given off during the 90 minute heating period.

| Product Data | |
|---|---|
| Yield | 476 g (97.5% of theoretical) |
| NH-number | 48.7, 49.0 |
| Acid number | 0.05 |
| Molar weight | 3000 |
| Viscosity $\eta_{75}$ | 426 mPa · s |
| Water Content (Karl Fischer) | 0.07% |
| Total Nitrogen Content | 2.49% |
| Primary Nitrogen | 1.18% |

EXAMPLE 4

Production of the Carbamate 2.25 kg of the same NCO-prepolymer as used in Example 1 were added dropwise over a period of 90 minutes to 242 g of 45% sodium hydroxide (2.72 moles), 2.1 liters of water and 2.3 g of Mersolat ®H ($OH^\ominus$:NCO=1.5:1). The internal temperature was kept at 18° C.; the mixture was subsequently stirred for 30 minutes at that temperature.

Production of the Amine (Using Method A1)

2 kg of the above carbamate reaction mixture was heated, with stirring, for one hour to 100° C. (bath temperature of 150° C.), with 6.45 liters of carbon dioxide being given off. Thereafter, the water was distilled off, first at a bath temperature of 100° C./33 mbar, and then at 100° C./1.33 mbar. The reaction product was cooled to 60° C. and separated off from the carbonic acid salt by filtration.

| Product Data | |
|---|---|
| Yield | 875 g (91.5%) |
| NH-number | 42.9, 43.2 |
| Acid number | <0.05 |
| Molar weight | 2700 |
| Viscosity $\eta_{75}$ | 445 mPa · s |
| Total Nitrogen Content | 2.48% |
| Primary Nitrogen | 1.05% |
| Water (Karl Fischer) | 0.02% |

EXAMPLE 5

Production of the Carbamate

A solution of 37.3 g of potassium hydroxide (0.664 mole) and 0.2 g of Mersolat ®H in 850 ml of water is initially introduced into the reaction vessel which is externally cooled by means of an ice bath. 1 kg of an NCO-prepolymer produced from 4,4'-diisocyanatodiphenylmethane and a propylene-glycol-started polyethylene oxide/polypropylene oxide (80/20) mixed polyether polyol (average molar weight 4000) and having an NCO-value of 1.86% (OH$^\ominus$:NCO=1.5:1) is added dropwise, with stirring, over a period of 70 minutes, the NCO-prepolymer having been heated beforehand to 50° C. An internal temperature of 15° to 20° C. is maintained during addition of the NCO-prepolymer.

Production of the Amine (Using Method A1)

This carbamate reaction mixture was treated in the same way as in Example 1 and the product data are reported below.

EXAMPLE 6

Production of the Carbamate

A solution of 38.63 g of potassium hydroxide (0.69 mole) and 0.5 g of Mersolat ®H in 800 ml of water is initially introduced into a reaction vessel. 1 kg of a "thin-layered" NCO-prepolymer produced from 2,4-tolylene diisocyanate and a trimethylol-propane-started polypropylene/polyethylene block copolyether triol (average molar weight 6000) and having an NCO-value of 1.93 (OH$^\theta$:NCO=1.5:1), is added, with stirring, over a period of 45 minutes, the NCO-prepolymer having been heated beforehand to 65° C. An internal temperature of 18° to 22° C. is maintained by cooling during addition of the NCO-prepolymer, the reaction mixture being subsequently stirred for one hour at 20° C.

Production of the Amine (Using Method A1)

This carbamate reaction mixture is treated in the same way as in Example 1 and the product data are reported below.

EXAMPLE 7

Production of the Carbamate

A solution of 47.7 g of sodium hydroxide (1.19 mole) and 0.6 g of Mersolat ®H in 500 ml of water is initially introduced into the reaction vessel. 1 kg of a "thin-layered" NCO-prepolymer produced from 2,4-tolylene diisocyanate and a polypropylene glycol (average molar weight 2000) and having an NCO-value of 3.58% (OH$^\theta$:NCO=1.4:1) is then added with stirring over a period of 165 minutes, the NCO-prepolymer having been heated beforehand to 55° C. An internal temperature of 15° to 20° C. is maintained during the addition, the reaction mixture being subsequently stirred for 45 minutes at 20° C.

Production of the Amine (Using Method A1)

This carbamate reaction mixture is treated in the same way as in Example 1.

| | Example 5 | Example 6 | Example 7 |
|---|---|---|---|
| Yield (g) | 970 (98%) | 980 (100%) | 970 (100%) |
| NH-number (mg KOH/g) | 23.7 | 24.6 | 48.7 |
| Acid number (mg KOH/g) | 0.25 | 0.09 | 0.3 |
| Molar weight | 4700 | 7000 | 2400 |
| Viscosity $\eta_{75}$ (mPa · s) | 1370 | 870 | 370 |
| Water content (%) | 0.35 | 0.1 | 0.1 |

EXAMPLE 8

Production of the Amine (Using Method A2—in vacuo)

From 1 kg of the freshly prepared carbamate reaction mixture of Example 1, the water is distilled off while stirring at a bath temperature of 80° C. (120 minutes/20 mbar) and 100° C. (60 minutes/0.6 mbar). After the product mixture has been cooled to 70° C., the carbon dioxide salt ($K_2CO_3$ and/or $KHCO_3$) is separated off from the amine by filtration.

| Product Data | |
|---|---|
| Yield | 485 g (98%) |
| NH-number | 44.3, 44.2 |
| Acid number | <0.05 |
| Molar weight | 2700 |
| Viscosity $\eta_{75}$ | 417 mPa · s |
| Water Content | 0.02% |
| Total Nitrogen Content | 2.43% |
| Primary Nitrogen | 1.07% |

This amine is obtained with substantially identical analytical data even when the water is distilled off using a thin-layer apparatus.

EXAMPLE 9

Production of the Amine (using Method A2)

From 1 kg of the freshly prepared carbamate reaction mixture of Example 4, the water is distilled off at a bath temperature of 100° C./20–24 mbar (90 minutes) and 100° C./0.6 mbar (30 minutes). After the product mixture has been cooled to 60° C., the carbon dioxide salt is separated off from the amine by filtration. The product data are reported below.

EXAMPLE 10

Production of the Carbamate

A solution of 71.23 g of sodium hydroxide (1.78 moles) in 1 liter of water is initially introduced into the reaction vessel. 1 kg of a thin-layered NCO-prepolymer produced from a mixture of 2,4-tolylene diisocyanate (80%) and 2,6-tolylene diisocyanate (20%) and a polypropylene glycol ether (average molecular weight 1000) and having an NCO-value of 6.23% (OH$^\theta$:NCO=1.2:1) is then added, with stirring, over a period of 120 minutes, the NCO-prepolymer having been heated beforehand to 70° C. An internal temperature of 15° to 20° C. is maintained during the addition, the reaction mixture being subsequently stirred for 30 minutes at 20° C.

Production of the Amine (Using Method A2)

The procedure is as in Example 9, except that the carbonic acid salt is filtered off under suction at 90° C. The product data is reported below.

EXAMPLE 11

Production of the Carbamate

A solution of 180.8 g of sodium hydroxide (4.52 moles) and 0.8 g of Mersolat H in 1 liter of water is initially introduced into the reaction vessel. A 20° C. solution of 1 kg of a thin-layered NCO-prepolymer (of 1,6-diisocyanatohexane and dipropylene glycol and having an NCO-value of 14.6%) in 1 liter of dioxane is added with stirring over a period of 120 minutes (OH$^\ominus$:-NCO=1.3:1). An internal temperature of 15° to 20° C. is maintained during addition of the NCO-prepolymer, the reaction mixture being subsequently stirred for 45 minutes at 25° C.

Production of the Amine (Using Method A2)

The procedure is the same in Example 9.

|  | Example 9 | Example 10 | Example 11 |
|---|---|---|---|
| Yield (g) | 400 (86%) | 912 (95%) | 864 (95%) |
| NH-number (mg KOH/g) | 43.2; 43.5 | 70.4; 69.6 | 190.0; 189 |
| Acid number (mg KOH/g) | 0.05 | 0.1 | 0.1 |
| Molar weight | 2700 | 1600 | 600 |
| Viscosity $\eta_{75}$ (mPa · s) | 437 | 810 | 260 |
| Water content (%) | 0.09 | 0.2 | 0.15 |

EXAMPLE 12

Production of the Amine (Using Method B—Extraction)

1 liter of dichloromethane is added to 1 kg of a one hour old carbamate reaction mixture according to Example 1 and the resulting mixture is stirred for 4 hours at 20° C. Thereafter, both phases are visually clear and effectively separable from one another. The organic phase is freed from the solvent, first at 100° C./20 mbar, and then at 100° C./1.3 mbar, leaving 400 g (87%) of a product which has a NH-number of 43.4, an acid number of <0.05 and a primary nitrogen content of 1.08%.

EXAMPLE 13

Production of the Carbamate

A mixture of 204 g of a 50% potassium hydroxide solution (1.82 moles), 1.4 liters of water and 1.5 g of Mersolat®H is initially introduced into the reaction vessel which is externally cooled by means of an ice bath. 1.5 kg of an NCO-prepolymer produced from tolylene-2,4-diisocyanate and a polypropylene glycol ether (average molar weight 2000) and having an NCO-value of 3.4% (OH$^\ominus$:NCO=1.5:1) are added over a period of 60 minutes, the NCO-prepolymer having been heated beforehand to 60° C. An internal temperature of 18° to 22° C. is maintained during the addition of the NCO-prepolymer, the reaction mixture being subsequently stirred for 20 minutes at 20° C.

Production of the Amine (Using Method A4—Salt-Forming Additive)

1 kg of the above carbamate reaction mixture is mixed with 1 liter of a 1:1 mixture of glycol monomethyl ether and glycol monomethyl ether acetate and the resulting mixture is heated to reflux temperature over a period of 135 minutes, 12.75 liters of carbon dioxide being given off. After removal of the solvent by distillation, first at 100° C./24–40 mbar, and then at 100° C./0.6 mbar, the salt precipitated, which contains potassium acetate (as determined by IR-spectroscopy and elemental analysis), is filtered off under suction.

| Product Data | |
|---|---|
| Yield | 409 g (86.5% of theoretical) |
| NH-number | 43.5, 44.2 |
| Molar weight | 2600 |
| Viscosity $\eta_{75}$ | 406 mPa · s |
| Water Content | 0.01% |
| Total Nitrogen Content | 2.49% |
| Primary Nitrogen | 1.10% |

(According to analysis by gas chromatography (GC), neither glycol monomethyl ether nor glycol monomethyl ether acetate is present in the amine-containing product.)

EXAMPLE 14

100 parts of an NCO-prepolymer (NCO-content 6.75%) produced from a diisocyanatodiphenylmethane mixture consisting of 50% of 2,4-diisocyanatodiphenylmethane and 50% of 4,4-diisocyanatodiphenylmethane and a polypropylene glycol ether having an average molar weight of 1500 are heated to 70° C. A crosslinker mixture heated to 70° C. is mixed with this isocyanate component, the crosslinker mixture consisting of 85 parts of an aminopolyether having an NH-number of 39.4, a molar weight of 2420 and a viscosity $\eta_{75}$ of 435 mPas, produced by the process according to the invention from an NCO-prepolymer of 2,4-tolylene diisocyanate and a polypropylene glycol ether having an average molar weight of 2000;

10 parts of a 3,5-diethyl-tolylene diamine (65% 2,4-/35% 2,6-isomer) chain-extending agent and 0.1 part of 1,4-diazabicyclooctane and 0.05 part of dibutyl tin dilaurate as catalysts.

The product data are reported below.

EXAMPLE 15

A mixture of 60 parts of an amino polyether which has an NH-number of 44.55, a molar weight of 2370 and a viscosity of 357 mPas and which has been obtained by the process according to the invention from an NCO-prepolymer produced from 2,4-tolylene diisocyanate and a polypropylene glycol ether having an average molar weight of 2000, and 40 parts of diethyl tolylenediamines (see example 14) are reacted at 20° C. with an NCO-semi-prepolymer obtained from tripropylene glycol and 4,4'-diisocyanatodiphenylmethane and having an NCO-value of 23%.

| Example 14 | | | Example 15 | | |
|---|---|---|---|---|---|
| NCO-prepolymer | 100 | parts | aminopolyether | 60 | parts |
| aminopolyether | 85 | parts | diethyl tolamine(+) | 40 | parts |
| diethyl tolamine mixture(+) | 10 | parts | diisocyanato-diphenylmethane | 23.5 | parts |

-continued

| Example 14 | | | Example 15 | | |
|---|---|---|---|---|---|
| diazabicyclo-octane | 0.1 | part | | | |
| dibutyltin dilaurate | 0.05 | part | | | |
| NCO-content of the prepolymer | 6.75% | | NCO content of the isocyanate | 23% | |
| index | 115 | | index | 100 | |
| mixing ratio of prepolymer to crosslinker mixture | 100:77.3 | parts | mixing ratio of crosslinker mixture to isocyanate | 100:23.5 | parts |
| Tensile test (DIN 53504) | | | | | |
| 100 [M Pa] | 2.9 | | | 3.5 | |
| 300 [M Pa] | 5.4 | | | 7.5 | |
| 500 [M Pa] | 8.0 | | | 15.0 | |
| ε [M Pa] | 29.1 | | | 18.9 | |
| [%] | 885 | | | 557 | |
| Tear propagation test (DIN 53515) [KN/m] | 30.4 | | | 21.6 | |
| Shore hardness (DIN 53505) [A] | 68 | | | 68 | |
| Elasticity (DIN 53512) [A] | 36 | | | 25 | |
| Compression set (DIN 53517) (24 h - 70° C.) [%] | 48 | | | 32 | |
| Abrasion (DIN 53516) [mm³] | 104 | | | 79 | |
| Pouring time | 13 | seconds | | 10 | seconds |
| Bending time | immediately nonbendable | | | immediately nonbendable | |

(+)a 65/35-mixture of { 3,5-diethyl-toluylene-2,4-diamine and 3,5-diethyl-toluylene-2,6-diamine. }

EXAMPLE 16

Continuous Production of the Reaction Mixture Containing Carbamate Groups

Component I 60 kg of an NCO-prepolymer (NCO-content 3.59%), produced from 2,4-tolylene diisocyanate and a bifunctional polypropylene glycol ether (average molar weight 2000), at 25° C.

Component II

A mixture of 20 kg of water and 8.58 kg of a 50% KOH-solution (OH$^\theta$:NCO=1.5:1), at 2° C.

Component I (the NCO-prepolymer) is metered, by means of a gear pump, into the central bore of a 500 ml-capacity spiked mixer rotating at 1500 rpm (and externally cooled by means of a medium at −20° C.) while Component II (the KOH-solution) is metered at an angular distance of 180° from the entry of the prepolymer, by means of an HL 2 Lewa pump, into two bores (nozzles) each 3 mm in diameter and the components are mixed together at a rate of 4 kg/min. The product stream issuing from the spiked mixer at a rate of 4 kg/min. has a temperature of 44° C.

Production of the Amine

The amine is recovered from the above reaction mixture by the method described in Example 17.

| Product Data | |
|---|---|
| Yield | 57 kg (97.5% of theoretical) |
| NH-number | 48.6 |
| Acid number | <0.01 |
| Molar weight | 2400 |
| Viscosity η₇₅ | 290 mPa · s |
| Water Content (Karl Fischer) | 0.22% |

EXAMPLE 17

Production of the Reaction Mixture Containing Carbamate Groups 200 g (1.79 moles) of a 50% KOH-solution 500 g of water and 0.5 g of Mersolat H are initially introduced into the reaction vessel. The solution is externally cooled by means of an ice bath. 623 g of a solution of trimeric tolylene diisocyanate in butyl acetate (NCO-value of 8.05%; OH$^\theta$:NCO=1.5:1) are added over a period of one hour. The internal temperature is kept at 18° to 25° C. during the addition, after which the mixture is stirred for 60 minutes. The reaction mixture has a very high viscosity.

Production of the Amine

The above carbamate reaction mixture is heated for three hours at a bath temperature of 150° C. and cooled to 80° C., after which the solid crystalline product is filtered off under suction. The compound melts at above 200° C. and is only soluble in highly polar solvents, such as dimethyl formamide.

| Product Data | |
|---|---|
| Yield | 140 g (95% of theoretical) |
| Molar weight (vapor pressure osmometry) | 782.5 |
| Primary Nitrogen | 7.4% |
| IR (KBr) | Isocyanurate and urea bands in addition to amine |

EXAMPLE 18

Production of the Carbamate 45.4 g (0.405 mole) of a 50% KOH-solution, 480 g of water and 0.5 g of Mersolat H are initially introduced into the reaction vessel. The solution is externally cooled by means of an ice bath. 500 g of the same NCO-prepolymer as used in Example 1 (OH$^\theta$:NCO=1:1) are added over a period of 20 minutes after heating to 60° C. The internal temperature is kept at 19° to 22° C. during the addition, rising to 27° C. towards the end of the reaction. The reaction mixture is then stirred for 15 minutes.

Production of the Amine

The above carbamate reaction mixture is stirred for 30 minutes at a bath temperature of 150° C. with 1.4 liters of carbon dioxide being given off. The water and volatile constituents are distilled off under reduced pressure (17 mbar) and at a bath temperature of 150° C., subsequently at a reduced temperature, and finally at a pressure reduced to 0.1 mbar/80° C. The resulting highly-viscous amine/carbonic acid salt mixture is taken up in 600 ml of dichloromethane and the carbonic acid salt is separated off by filtration. After removal of the solvent by distillation, the polyamine is obtained from the dichloromethane phase in the form of a substantially colorless, highly-viscous oil.

| Product Data | |
|---|---|
| Yield | 413 g (84.5% of theoretical) |
| NH-number | 31.55 |
| Acid number | 0.3 |
| Molar weight | 3900 |
| Viscosity $\eta_{75}$ | 2050 mPa · s |
| Water Content (Karl Fischer) | 0.02% |

EXAMPLE 19

Production of the Carbamate 27.2 g (0.243 mole) of a 50% KOH-solution, 490 g of water and 0.5 g of Mersolat H are initially introduced into the reaction vessel which is externally cooled by means of an ice bath. 500 g of the same NCO-prepolymer as used in Example 1 (OH$^\ominus$:NCO=0.6:1) are added over a period of 20 minutes after the prepolymer has been heated to 60° C. The internal temperature is kept, by cooling, at 20° to 24° C. during the addition and the reaction mixture is then stirred for 30 minutes.

Production of the Amine

The above carbamate reaction mixture is stirred for 30 minutes at a bath temperature of 150° C. The water is distilled off at 16 mbar/150° C., then at 16 mbar/100° C., and finally at 0.15 mbar/80° C. A considerable increase in viscosity occurs after around 200 g of water has been distilled off. One liter of dichloromethane is added to the resulting, high-viscosity amine/salt mixture and the carbonic acid salt filtered off. The dichloromethane is then distilled off again.

| Product Data | |
|---|---|
| Yield | 381 g (78% of theoretical) |
| NH-number | 11.35 |
| Acid number | 0.04 |
| Molar weight | 10,000 |
| Viscosity $\eta_{75}$ | 59,000 mPa · s |
| Water content | 0.1% |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of aromatic and/or aliphatic, primary polyamines by the hydrolysis of compounds containing isocyanate groups, comprising
   (I) converting aromatic and/or aliphatic compounds containing from 0.5 to 40% by weight of isocyanate groups into compounds containing carbamate groups by mixing said aromatic and/or aliphatic compounds with a strong aqueous base and at least a stoichiometric quantity of water and
   (II) recovering polyamines directly from the compounds containing carbamate groups by thermal decomposition or by solvent extraction.

2. A process according to claim 1, characterized in that the aromatic and/or aliphatic compounds containing free NCO-groups are polyfunctional NCO-preadducts of polyisocyanates with relatively high molecular weight polyhydroxyl compounds from the series consisting of polyethers, polycarbonates, polyacetals, polythioethers, polysiloxanes or polybutadienes having molecular weights in the range of from 400 to 12,000 and-/or with chain-extending agents containing NCO-reactive groups and having molecular weights in the range of from 18 to 399.

3. A process according to claim 1, characterized in that the aromatic and/or aliphatic compounds containing free NCO-groups are in solution in an NCO-inert solvent.

4. A process according to claim 1, characterized in that the base is an alkali hydroxide, alkaline earth hydroxide and/or quaternary tetraalkyl ammonium hydroxide.

5. A process according to claim 1, characterized in that the base is used in quantities of from 0.3:1 to 2:1 equivalents of base per NCO-group.

6. A process according to claim 1, characterized in that the base is used in the form of an aqueous solution.

7. A process according to claim 1, characterized in that step II is accomplished by heat treating the compounds containing carbamate groups at temperatures up to 200° C. and recovering the polyamines.

8. A process according to claim 1, characterized in that step II is accomplished by treating the compounds containing carbamate groups with one or more solvents and extracting the resulting polyamines.

9. A process according to claim 1, characterized in that step II is accomplished by heat treating the compounds containing carbamate groups at temperatures up to 200° C. in the presence of solvents and in a vacuum and extracting the resulting polyamines.

10. A process according to claim 8 or 9, characterized in that the solvents are water-immiscible organic solvents.

11. A process according to claim 1, characterized in that between steps I and II, the compounds containing carbamate groups are treated with between 0.01 and 0.99 equivalents of a proton donor, based on the quantity of base used in step I.

12. A process according to claim 1, characterized in that between 0.01 and 0.99 equivalents of a proton donor, based on the quantity of base used in step I, are added during step II.

13. A process according to claim 1, characterized in that in step II, the polyamines are separated off by phase separation, crystallization or extraction.

14. A process for the production of optionally cellular polyurethane plastics by reacting
    (a) polyisocyanates and/or blocked polyisocyanates with (b) polyamines and
(c) optionally other low molecular weight and/or relatively high molecular weight compounds containing isocyanate-reactive groups and other known auxiliaries and additives, characterized in that the polyamines are produced by the hydrolysis of compounds containing isocyanate groups by converting them into compounds containing carbamate groups by mixing them with a base and at least a stoichiometric quantity of water, and recovering polyamines directly from the compounds containing carbamate groups by thermal decomposition or by solvent extraction.

* * * * *